(12) United States Patent
Al-Saud et al.

(10) Patent No.: US 9,513,510 B1
(45) Date of Patent: Dec. 6, 2016

(54) ALIGNMENT MATERIAL FOR LIQUID CRYSTAL LENS AND LIQUID CRYSTAL LENS SYSTEM

(71) Applicant: King Abdulaziz City for Science and Technology (KACST), Riyadh (SA)

(72) Inventors: Turki Saud Mohammed Al-Saud, Riyadh (SA); Rashid Mohammed Altamimi, Riyadh (SA); Vladimir Enokovich Agabekov, Minsk (BY); Alexander Anatolievich Muravsky, Minsk (BY); Anatoli Alexandrovich Murauski, Minsk (BY); Veranika Sergeevna Biazruchanka, Minsk (BY)

(73) Assignees: King Abdulaziz City for Science and Technology (KACST), Riyadh (SA); Institute of Chemistry of New Materials, National Academy of Science of Belarus (BY)

( * ) Notice: Subject to any disclaimer, the term of this patent is extended or adjusted under 35 U.S.C. 154(b) by 0 days.

(21) Appl. No.: 14/922,992

(22) Filed: Oct. 26, 2015

(51) Int. Cl.
*C09K 19/00* (2006.01)
*G02F 1/1337* (2006.01)
*G02F 1/1333* (2006.01)

(52) U.S. Cl.
CPC ... *G02F 1/133711* (2013.01); *G02F 1/133784* (2013.01); *G02F 1/133788* (2013.01); *G02F 2001/133302* (2013.01); *G02F 2001/133715* (2013.01); *Y10T 428/10* (2015.01); *Y10T 428/1005* (2015.01)

(58) Field of Classification Search
CPC ............... C09K 19/56; G02F 1/133711; G02F 1/13378; G02F 1/133788; G02F 2001/133761; G02F 2001/133742; G02F 2001/133715; G02F 2001/133302; Y10T 428/10; Y10T 428/1006
USPC ............ 428/1.1, 1.2; 349/33, 123, 128, 134; 526/316; 385/15; 252/299.4
See application file for complete search history.

(56) References Cited

U.S. PATENT DOCUMENTS

2007/0258677 A1*  11/2007  Chigrinov .......... G02B 6/12007
                                             385/15

* cited by examiner

*Primary Examiner* — Ruiyun Zhang
(74) *Attorney, Agent, or Firm* — Geeta Kadambi Riddhi IP LLC (57) ABSTRACT

There is provided an alignment material for a liquid crystal (LC) lens comprising a co-polymer of a photosensitive monomer and at least one alkyl methacrylate monomer. The material allows for the fabrication of a LC lens or LC lens system that is self-aligned and polarization-independent.

19 Claims, 10 Drawing Sheets

ALIGNMENT MATERIAL FOR LIQUID CRYSTAL LENS AND LIQUID CRYSTAL LENS SYSTEM

FIELD OF TECHNOLOGY

This disclosure relates generally to electrically tunable liquid crystal (LC) lens. More specifically, this disclosure relates to an alignment material capable of generating pretilt angles upon exposure to light. Also, this disclosure relates to LC lenses and LC lens systems comprising such alignment material. Moreover, this disclosure relate to a method for making such LC lenses and LC lens systems.

BACKGROUND

Typically, a regular LC lens is polarization-dependent. In order to obtain a polarization-independent LC lens system, two or more LC lenses or sub-lenses are stacked together and mutual orthogonal orientation is attempted. Each sub-lens is manufactured separately and special precise mechanics are required in order to achieve a mutual alignment of the optical axes. This constitutes a complicated and challenging process. A poor alignment generally induces polarization aberration which affects the quality of image, i.e., image doubling.

An attempted solution to this problem known in the art is the use of alignment layers. More specifically, the alignment material which typically comprises a photo-aligned polymer is staked in layers on a substrate. The alignment material is capable of generating pretilt angles (Chung-Yung Lee et al., 2009).

Another attempted solution constitutes of using a single polarization-dependent LC lens, snap shooting of two frames with computer processing (Bao R. et al., 2014). However, with this approach the exposure time is doubled, which decreases the probability of taking a sharp picture due to shake-vibration and scene change possibility.

There is a need for more efficient polarization-independent LC lenses and LC lens systems. Also, there is a need for improved and efficient methods for obtaining such LC lenses and LC lens systems.

SUMMARY

This disclosure is drawn to an alignment material for a LC lens comprising a co-polymer of a photosensitive monomer and at least one alkyl methacrylate monomer. The material allows for the fabrication of a LC lens or LC lens system that is self-aligned and polarization-independent. The LC lens or LC lens system of this disclosure has a focal length which may be changed in a low voltage controlled manner, such as for example below about 10V AC. The fabrication process of this disclosure allows for a simultaneous fabrication of two orthogonally oriented sub-lenses in a self-aligned manner.

Several aspects and embodiments for the material, LC lens and LC lens system comprising such material, and method for making such LC lens and LC lens system are outlined below.

According to an aspect, this disclosure relates to an alignment material for a liquid crystal (LC) lens, comprising a co-polymer of a photosensitive monomer and at least one alkyl methacrylate monomer.

In one embodiment, the photosensitive monomer is of general formula I or II, and the at least one alkyl methacrylate monomer is of general formula III wherein: R is a $C_1$ to $C_{12}$ linear, branched, saturated and/or unsaturated alkyl group; Ri, Rj and Rk each independently selected from the group consisting of H and $C_1$ to $C_{12}$ linear, branched, saturated and/or unsaturated alkyl groups; n is an integer from 0-3; m and l are each independently an integer from 0-4; and p is an integer from 0-30.

In one embodiment, the photosensitive monomer is of general formula IA or IIA, and the at least one alkyl methacrylate monomer is of general formula III

IIA

III wherein: R is a $C_1$ to $C_6$ alkyl group; Rk is a H or a $C_1$ to $C_6$ alkyl group; m is an integer from 0-2; and p is an integer from 1-20.

In one embodiment, the photosensitive monomer is of formula M or F, and the at least one alkyl methacrylate monomer is selected from formulae VA, PL and PL1

M

F

VA

PL

PL1

In one embodiment, the co-polymer is of M, VA, PL and PL1 or the co-polymer is of F, VA, PL and PL1.

In one embodiment, the co-polymer is of M, VA, PL and PL1; and wherein M is present in an amount of about 7-17% mol, preferably about 9-15% mol, more preferably about 12% mol; VA is present in an amount of about 2.5-12.5% mol, preferably about 4.5-10.5% mol, more preferably about 7.5% mol; PL is present in an amount of is present in an amount of about 65.5-75.5% mol, preferably about 67.5-73.5% mol, more preferably about 70.5% mol; and PL1 is present in an amount of about 5-15%, preferably about 7-13% mol, more preferably about 10% mol.

In one embodiment, the co-polymer is of F, VA, PL and PL1; and wherein F is present in an amount of about 0.5-9% mol, preferably 2-8% mol, more preferably about 5% mol; VA is present in an amount of about 3-15.5% mol, preferably about 4.5-10.5% mol, more preferably about 7.5% mol; PL is present in an amount of about 73-82.5% mol, preferably about 74.5-80.5% mol, more preferably about 77.5; and PL1 is present in an amount of about 5.5-15% mol, preferably about 7-13% mol, more preferably about 10% mol.

According to another aspect, this disclosure relates to a liquid crystal (LC) lens comprising: a first planar substrate having on a surface thereof a layer of first alignment material comprising a co-polymer of a first photosensitive monomer and at least one alkyl methacrylate monomer; and a second planar substrate having on a surface thereof a layer of second alignment material comprising a co-polymer of a second photosensitive monomer and at least one alkyl methacrylate monomer, wherein the first and second substrates are assembled in parallel configuration such that the layers of alignment material face each other and are spaced apart, and wherein the first and second photosensitive monomers are of different photosensitivities, and wherein particles of the first alignment material have a pretilt angle gradient that is different from a pretilt angle gradient of the second alignment material.

In one embodiment, the lens further comprises a spacer between the layers of alignment material. In one embodiment, the substrates are attached together at contours thereof, optionally the attachment is made with UV glue. In one embodiment, the substrates are glass substrates. In one embodiment, the lens further comprises an electrode mounted on a surface of at least one of the substrate. In one embodiment, the lens has a focal length which may be controllably changed at a voltage between about 1-10V AC, preferably about 1-5V AC.

According to yet another aspect, this disclosure relates to a liquid crystal (LC) lens system comprising: first planar substrates each having on both surfaces thereof a layer of first alignment material comprising a co-polymer of a first photosensitive monomer and at least one alkyl methacrylate monomer; and second planar substrates each having on both surfaces thereof a layer of second alignment material comprising a co-polymer of a second photosensitive monomer and at least one alkyl methacrylate monomer, wherein the substrates are assembled in parallel configuration such that a layer of first alignment material and a layer of second alignment material face each other and are spaced apart, and wherein the first and second photosensitive monomers are of different photosensitivities, and wherein particles of the first alignment material have a pretilt angle gradient that is different from a pretilt angle gradient of the second alignment material.

In one embodiment, a pretilt angle gradient in the first alignment material on the first substrates is identical, and a pretilt angle gradient in the second alignment material on the second substrates is identical.

According to yet another aspect, this disclosure relates to a method for making an electrically tunable liquid crystal (LC) lens, comprising: (a) providing a first planar substrate and a second planar substrate; (b) depositing on a surface of the first substrate a layer of a first alignment material comprising a co-polymer of a first photosensitive monomer and at least one alkyl methacrylate monomer; (c) depositing on a surface of the second substrate a layer of a second alignment material comprising a co-polymer of a second photosensitive monomer and at least one alkyl methacrylate monomer; (d) submitting each of the first substrate obtained at step (b) and the second substrate obtained at step (c) to a soft-baking process; (e) submitting each of the first and second substrates obtained at step (d) to a rubbing process; (f) submitting each of the first and second substrates obtained at step (e) to UV exposure; (g) assembling the first and second substrates obtained at step (f) in parallel configuration such that the layers of alignment material face each other and are spaced apart, wherein the first and second photosensitive monomers are of different photo sensitivities, and wherein particles of the first alignment material have a pretilt angle gradient that is different from a pretilt angle gradient of the second alignment material.

In one embodiment, at steps (b) and (c) the materials are in a solvent and the soft-baking process at step (d) removes the solvent. In one embodiment, at step (e) rubbing directions on the two sides of the substrate are orthogonal, and the rubbing process induces an azimuthal alignment of particles in the materials. In one embodiment, at step (f) a gradient UV exposure is performed simultaneously on two sides of the substrate, and the UV exposure induces a pretilt angle in particles of the alignment materials.

According to yet another aspect, this disclosure relates to a method for making an electrically tunable liquid crystal lens (LC) system, comprising: (a) providing first planar substrates and second planar substrates; (b) depositing on both surfaces of each of the first substrates a layer of a first alignment material comprising a co-polymer of a first photosensitive monomer and at least one alkyl methacrylate monomer; (c) depositing on both surfaces of each of the two second substrates a layer of a second alignment material comprising a co-polymer of a second photosensitive monomer and at least one alkyl methacrylate monomer; (d) submitting each of the first substrates obtained at step (b) and each of the second substrates obtained at step (c) to a soft-baking process; (e) submitting each of the first and second substrates obtained at step (d) to a rubbing process; (f) submitting each of the first and second substrates obtained at step (e) to UV exposure; and (g) assembling the first substrate and second substrates obtained at step (f) in parallel configuration such that a layer of first alignment material and a layer of second alignment material face each other and are spaced apart, wherein the first and second photosensitive monomers are of different photo sensitivities, and wherein particles of the first alignment material have a pretilt angle gradient that is different from a pretilt angle gradient of the second alignment material.

Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In order to provide a clear and consistent understanding of the terms used in the present disclosure, a number of definitions are provided below. Moreover, unless defined otherwise, all technical and scientific terms as used herein have the same meaning as commonly understood to one of ordinary skill in the art to which this disclosure pertains.

The use of the word "a" or "an" when used in conjunction with the term "comprising" in the claims and/or the description may mean "one", but it is also consistent with the meaning of "one or more", "at least one", and "one or more than one". Similarly, the word "another" may mean at least a second or more.

As used herein, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein, when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

This disclosure is drawn to an alignment material for a LC lens comprising a co-polymer of a photosensitive monomer and at least one alkyl methacrylate monomer. The material allows for the fabrication of a LC lens or LC lens system that is self-aligned and polarization-independent. The LC lens or LC lens system of this disclosure has a focal length which may be changed in a low voltage controlled manner, such as for example below about 10V AC. The fabrication process of this disclosure allows for a simultaneous fabrication of two orthogonally oriented sub-lenses in a self-aligned manner.

DESCRIPTION OF A PREFERRED EMBODIMENT

Figure 1:
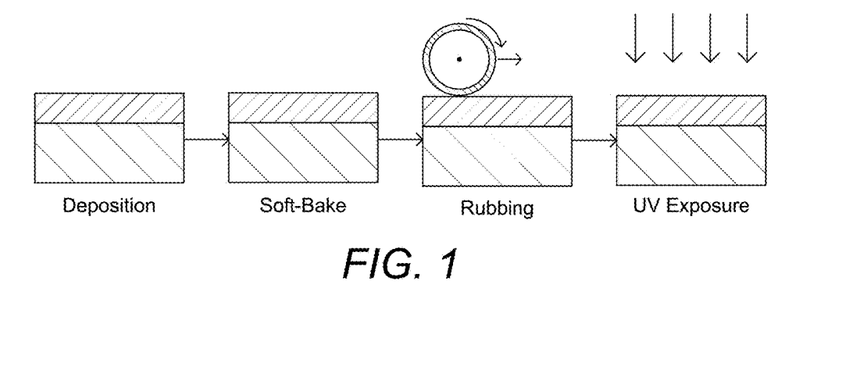
FIG. 1 Sequences of a patterned rubbing alignment process.

This disclosure provides for a liquid crystal alignment material for patterned rubbing alignment process (FIG. 1). The process is applied to create a controllable pretilt angle gradient. The method of fabrication of self-aligned polarization liquid crystal lens is based on application of the liquid crystal alignment materials. As illustrated in FIG. 1, the alignment material is processed in four main steps: a) deposition of a layer (wet film) of alignment material in a solvent, b) soft-baking to remove the solvent, c) rubbing to induce the azimuthal alignment direction and d) UV exposure to induce the pretilt angle.

Figure 2A:
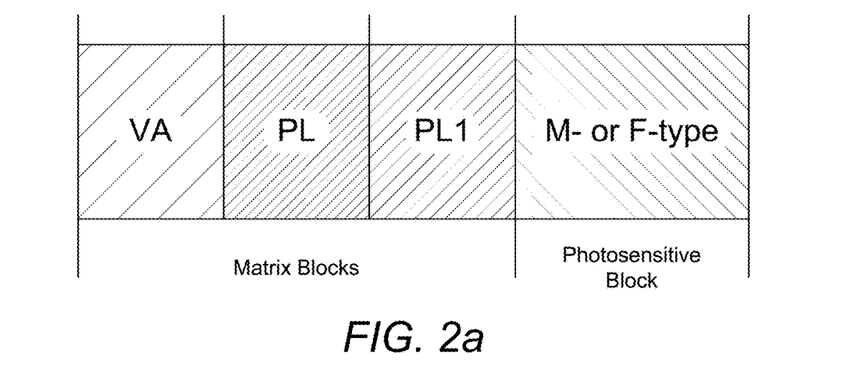
FIG. 2a Structure of a co-polymer of the alignment material.

The alignment material is an organic co-polymer of four monomers. The four monomers are divided in two categories. A first category constituted a photosensitive monomer (photosensitive block) and a second category constituted of at least one alkyl methacrylate (matrix blocks). A structure of the co-polymer is illustrated in FIG. 2a.

Figure 2B:
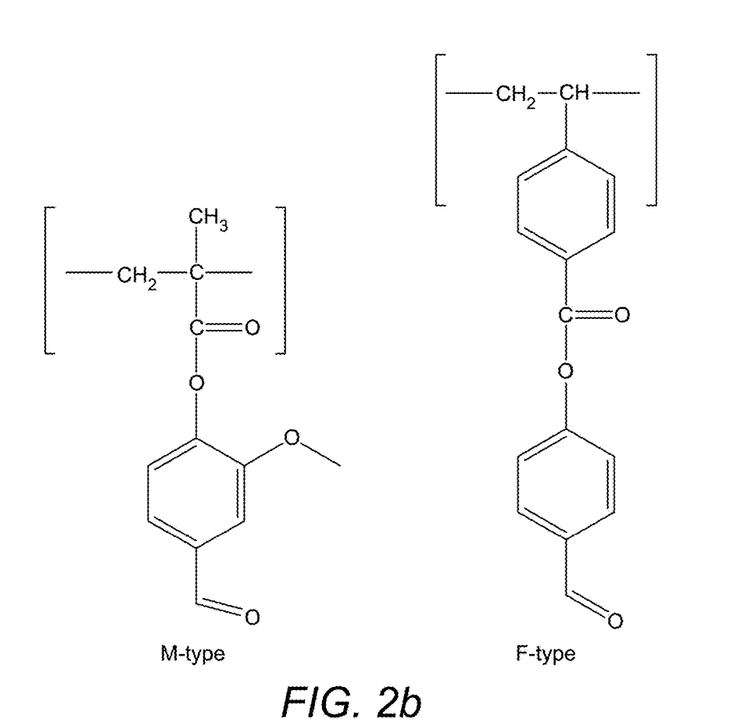
FIG. 2b Chemical formulae of preferred photosensitive monomers.

A photosensitive monomer can be of type M or type F. Preferred photosensitive monomers are illustrated in FIG. 2b. As will be understood by a skilled person, a type M photosensitive monomer of this disclosure may be any monomer of general formula I or IA outlined in FIG. 2d and FIG. 2e and reproduced below. In these formulae: R is a $C_1$ to $C_{12}$ linear, branched, saturated and/or unsaturated alkyl group, preferably R is a $C_1$ to $C_6$ alkyl group, more preferably R is $CH_3$; R1 is H or a $C_1$ to $C_{12}$ linear, branched, saturated and/or unsaturated alkyl group, preferably Ri is a H or a $C_1$ to $C_6$ alkyl group, more preferably Ri is H; and n is an integer from 0-3, preferably n is 0.

Figure 2C:
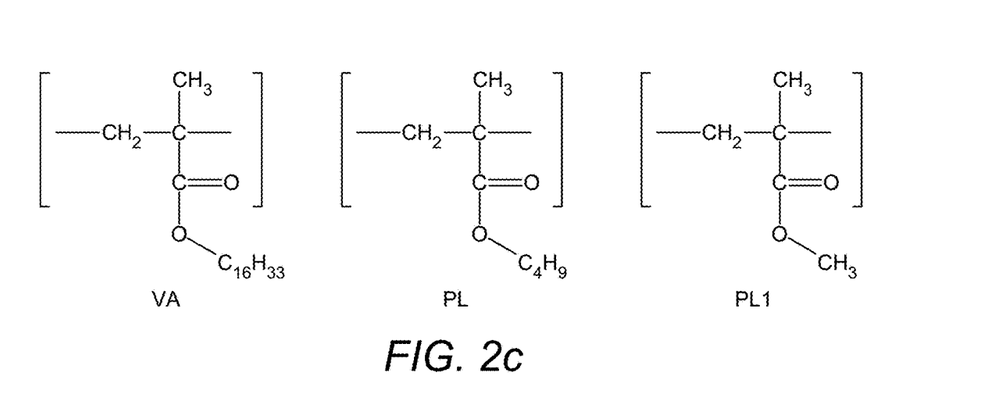
FIG. 2c Chemical formulae of preferred alkyl methacrylate monomers.
Figure 2D:
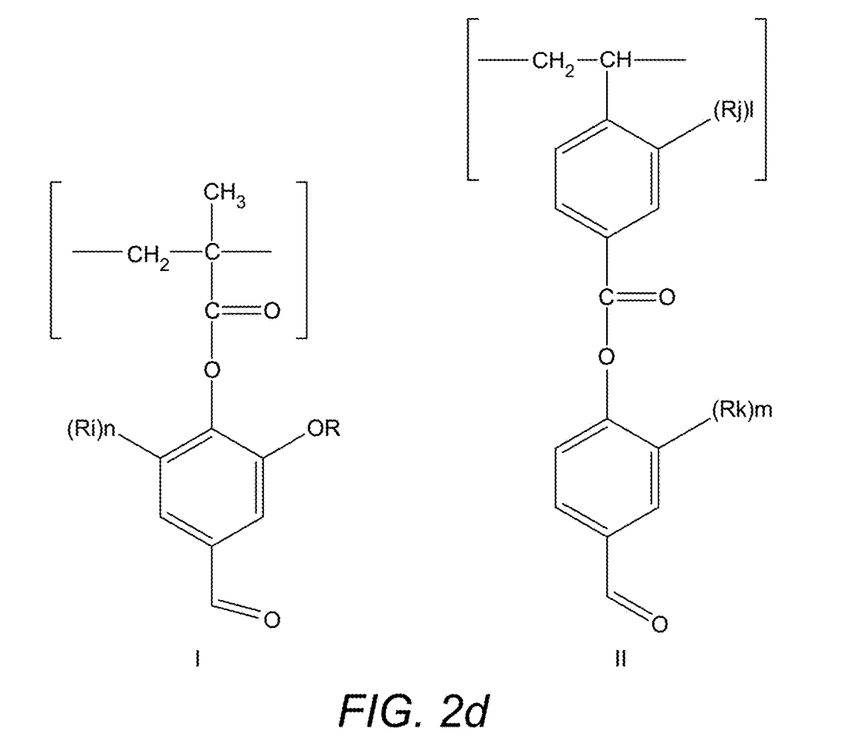
FIG. 2d General chemical formulae of photosensitive monomers.
Figure 2E:
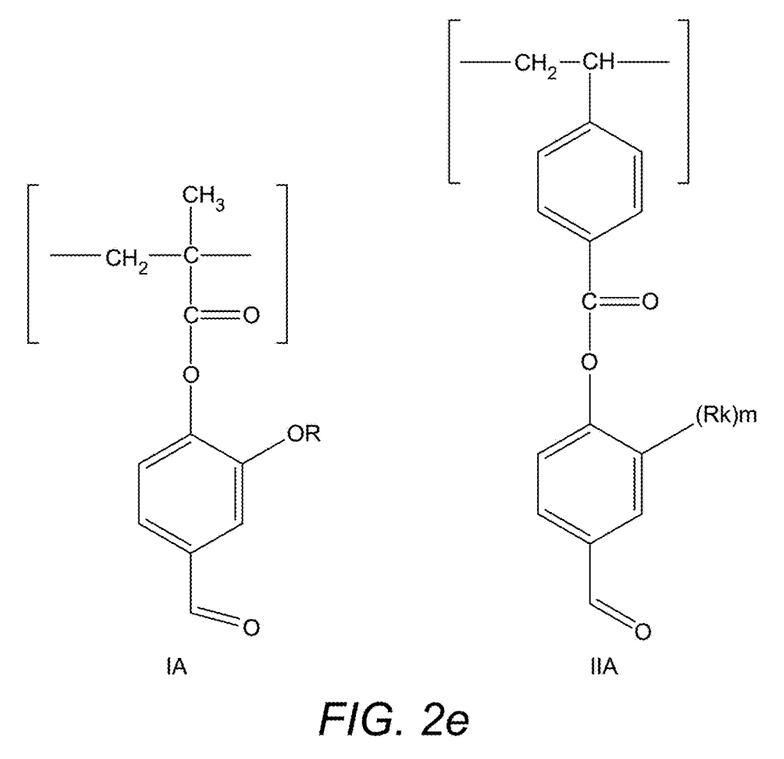
FIG. 2e General chemical formulae of photosensitive monomers.

Also, as will be understood by a skilled person, a type F photosensitive monomer of this disclosure may be any monomer of general formula II or IIA outlined in FIG. 2d and FIG. 2e and reproduced below. In these formulae: Rj and Rk each independently selected from the group consisting of H and $C_1$ to $C_{12}$ linear, branched, saturated and/or unsaturated alkyl groups, preferably Rj and Rk each independently selected from the group consisting of H and $C_1$ to $C_6$ alkyl group, more preferably Rj and Rk are each H; and m and l are each independently an integer from 0-4, preferably m and l are each 0.

-continued

IIA

Figure 4:
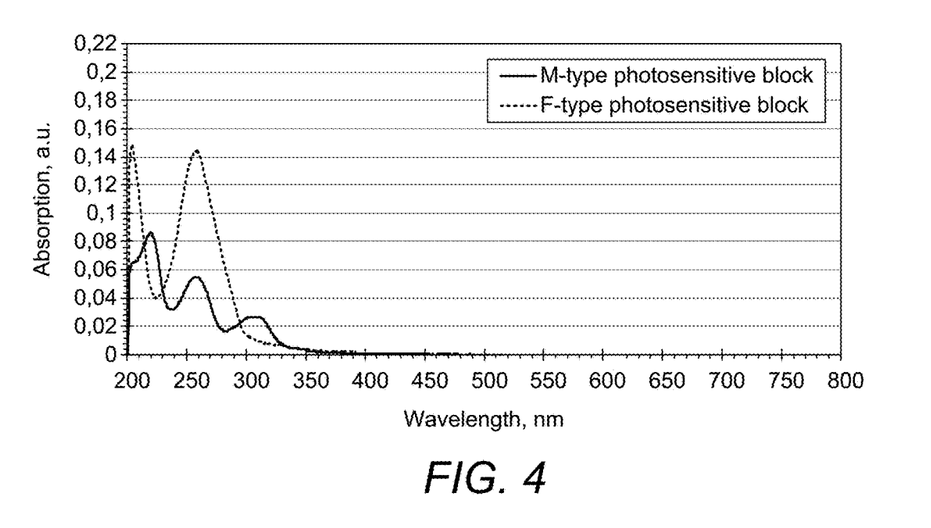
FIG. 4 Absorption spectra of alignment materials with M-type photosensitive monomer and F-type photosensitive monomer. The thickness of a layer on a substrate is about 40 nm.

The two types of photosensitive monomers have different photosensitivities. The type M photosensitive monomer has a high photosensitivity and the type F has a low photosensitivity (FIG. 4).

Preferred embodiments of the matrix blocks or alkyl methacrylate monomers are VA, PL and PL1 outlined in FIG. 2c and reproduced below.

VA

PL

PL1

Figure 2F:
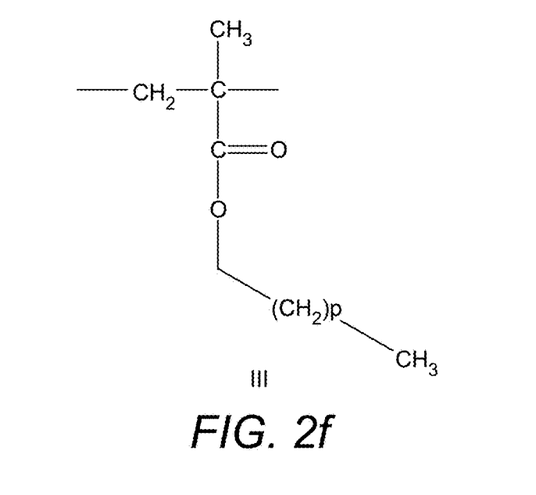
FIG. 2f General chemical formulae of alkyl methacrylate monomers.

As will be understood by a skilled person, an alkyl methacrylate of this disclosure may be any alkyl methacrylate of general formula III outlined in FIG. 2f and reproduced below. In this formula, p is an integer from 0-30; preferably p is an integer from 0-20, more preferably p is an integer from 0-15.

III

In a preferred embodiment, the co-polymer comprises either the type M photosensitive monomer or the type F photosensitive monomer as photosensitive block, and the three alkyl methacrylate monomers VA, PL and PL1 as matrix blocks. Such structure is illustrated in FIG. 2a. As will be understood by a skilled person, the co-polymer can be of any suitable combination of these components.

The alignment material is provided in a solvent or liquid crystal. The matrix blocks determine the interaction of the co-polymer with the solvent or liquid crystal. The solvent may be butyl acetate for example or any other suitable solvent.

Figure 3A:
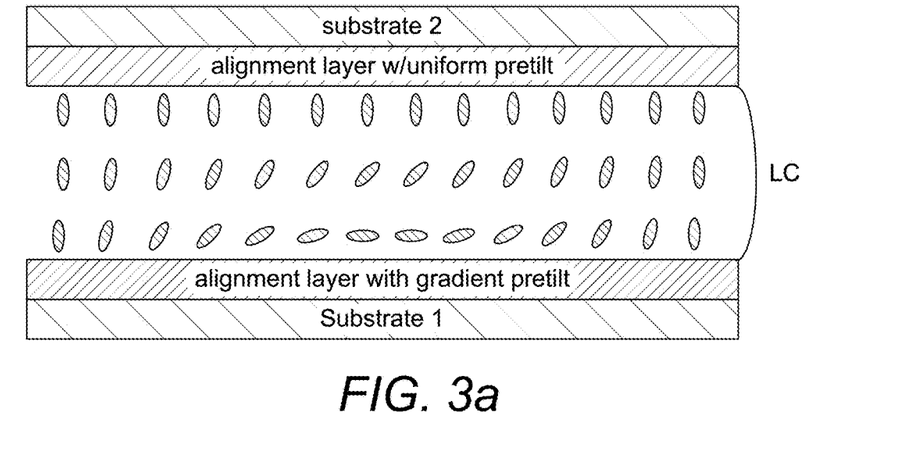
FIG. 3a Structure of a LC lens (or sub-lens when staked to constitute a lens system).
Figure 3B:
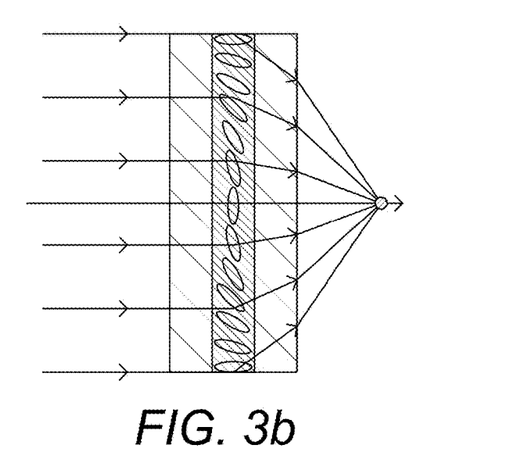
FIG. 3b Scheme of the LC lens' focus.

A LC lens (or LC sub-lens when staked to constitute a lens system) is illustrated in FIG. 3a. The lens or sub-lens comprises two substrates. A first substrate which has a layer of alignment material with pretilt angle gradient and a second substrate which has a layer of alignment material with uniform alignment. The alignment material on the first substrate comprises a co-polymer with a type M photosensitive monomer (high photosensitivity) and the alignment material on the second substrate comprises a co-polymer with a type F photosensitive monomer (low photosensitivity). FIG. 3b is a scheme of the lens' focus.

The first and second substrates assembled into the cell or lens such as to create a cell-gap. The cell-gap may be provided by a spacer. The substrates are attached together at their contours. Attachment may be made using UV glue or any other suitable attachment means.

For the fabrication of a lens system with two sub-lenses, both first substrates with alignment material comprising a co-polymer with type M monomer (high photosensitivity) are prepared simultaneously, by deposition of the alignment material on both sides of the double side coated ITO glass substrate. The rubbing directions on the two sides of the ITO glass substrate are orthogonal. Gradient UV light exposure is performed simultaneously on both sides of the glass, directly through the glass, on the up and down surface of the glass substrate. This creates an identical pretilt angle gradient on the first substrates (which are the two sides of the same glass substrate) and hence for the two sub-lenses. Also, both second substrates with alignment material comprising a co-polymer with type F monomer (low photosensitivity) are prepared simultaneously, thus creating an identical uniform pretilt on the substrate and hence for the two sub-senses.

Since the first substrates of each sub-lens are located on the same piece of glass, there is no need for mutual alignment of the sub-lenses.

Figure 5:
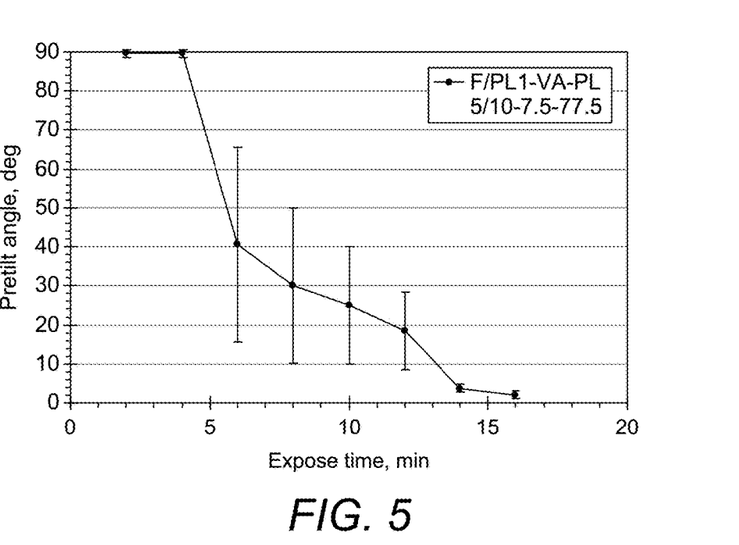
FIG. 5 Pretilt angle dependence on exposure time for alignment material which comprises a co-polymer of F/PL1-VA-PL in a ratio 5/10-7.5-77.5. The exposure intensity is 4 mW, UV-B 300-330 nm.

The intrinsic self-alignment of sub-lenses is achieved by simultaneous fabrication of mutually centered and aligned pretilt angle gradients of both sub-lenses at both surfaces of the substrate. The latter is achieved by development of new alignment materials—polymers with M- and F-type photosensitive block for high and low photosensitivity (FIG. 4), correspondingly,—that both are capable to change its pretilt angle upon light exposure with UV-B (300-320 nm) spectral range (example FIG. 5) in an exposure dose dependent manner.

The high photosensitivity co-polymer comprises 12% mol of M-type photosensitive block, 10% mol of PL1 matrix block, 70.5% mol of PL matrix block and 7.5% mol of VA matrix block. The low photosensitivity co-polymer comprises 5% mol of F-type photosensitive block, 10% mol of PL1 matrix block, 77.5% mol of PL matrix block and 7.5% mol of VA matrix block.

Figure 6A:
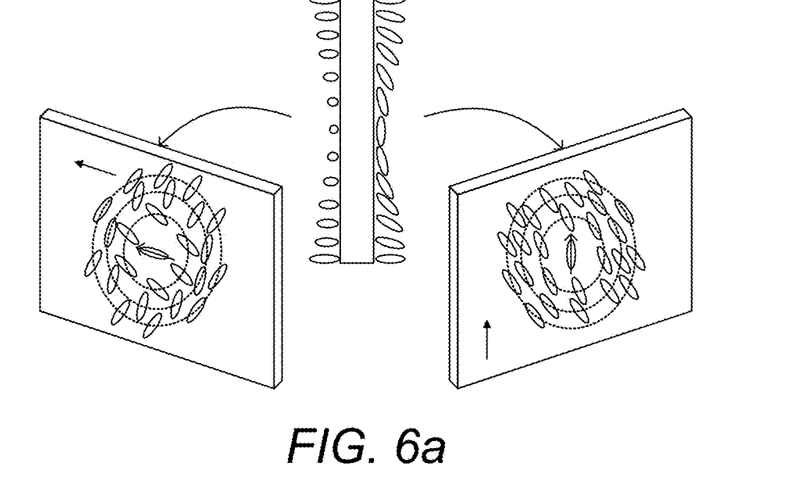
FIG. 6a shows two orthogonal LC alignment spherical lens patterns on both sides of a substrate.
Figure 6B:
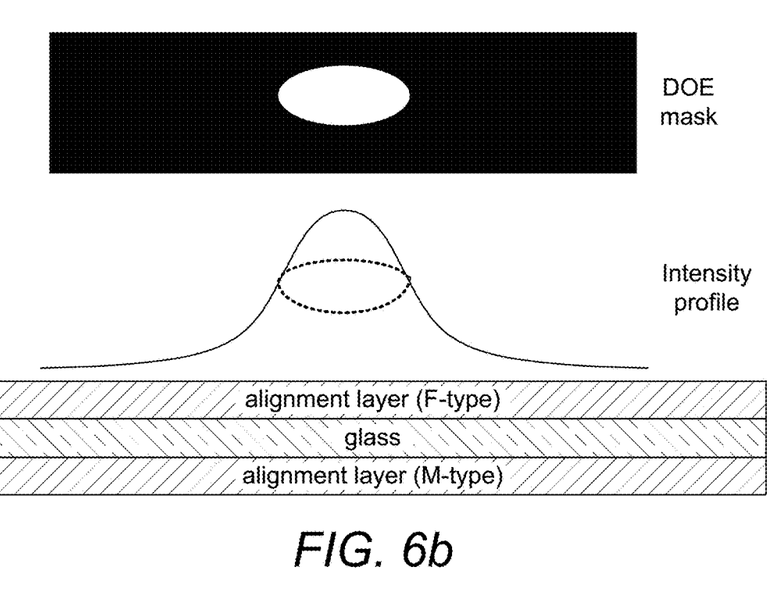
FIG. 6b Scheme of "round hole" diffraction optical element (DOE) exposure for LC lens pretilt angle gradient alignment layers on both sides of a substrate.

The difference in the photosensitivity of the alignment materials with M- and F-type photosensitive groups (FIG. 4) allows achieving similar gradient of the pretilt angle, when low/high sensitivity material is deposited on top/bottom of the substrate, rubbed in orthogonal directions, correspondingly (FIG. 6a) and light exposure is performed from the top side of the substrate (FIG. 6b). "DOE Mask" is a diffraction optical element mask or a photomask that provides light intensity distribution at the surface on the first substrate, which induces LC lens pretilt angle gradient generation upon photo exposure through the mask.

Figure 7A:
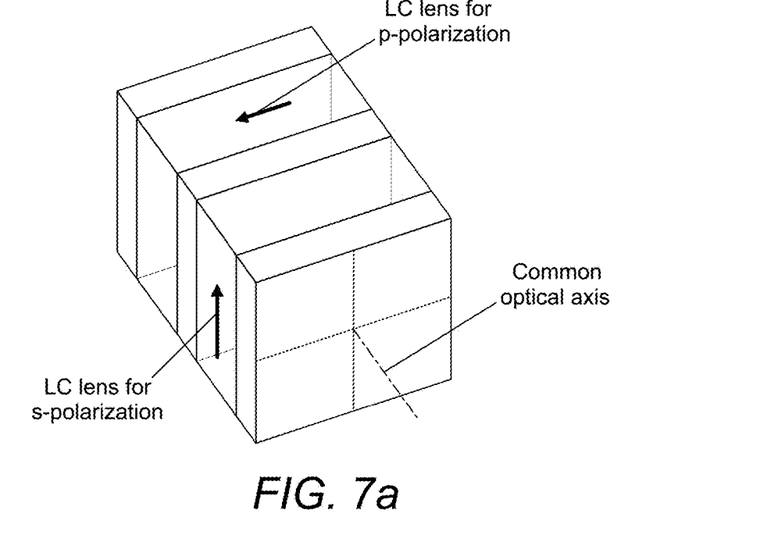
FIG. 7a Structure of self-aligned polarization-independent LC lens.
Figure 7B:
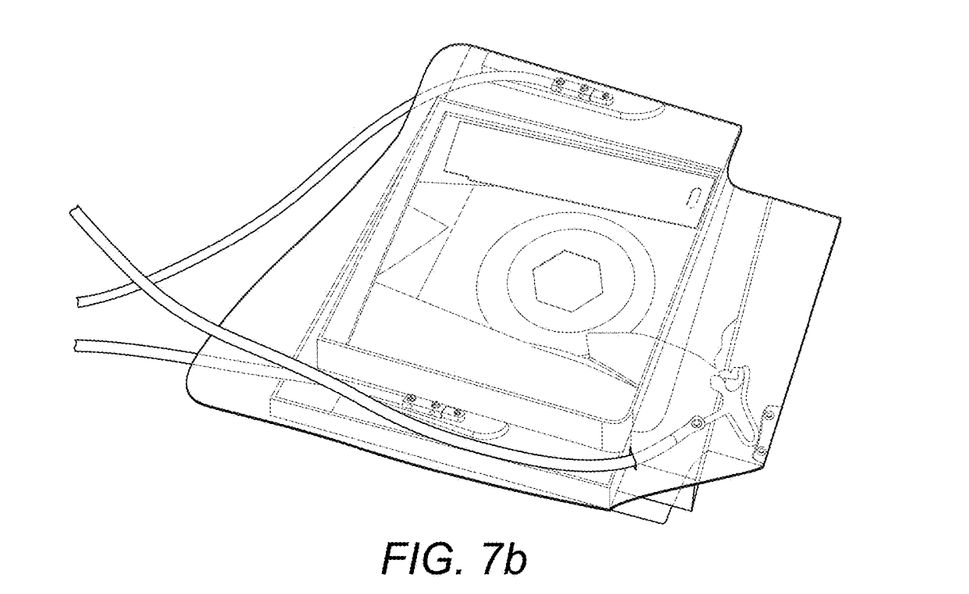
FIG. 7b Sample of self-aligned polarization-independent LC lens.

The self-aligned polarization-independent LC lens system (FIG. 7) comprises two sub-lenses, which has two electrodes each at top and bottom substrates. Hence voltage application to the sub-lens requires two wires, and four wires total for the polarization-independent LC liquid crystal lens system. It should be noted that using common ground wire for both sub-lenses reduces the number of control wires to three and remains the ability of independent control of each sub-lens. However, if independent control of each lens is not required, two wires only are sufficient: one common ground and one common control voltage.

Each sub-lens has two electrodes. The first electrode of a sub-lens is short-circuited to the first electrode of another sub-lens, while the second electrode of a sub-lens is short-circuited to the second electrode of another sub-lens. Thus there are two electric wires connected to the first and the second electrodes.

The two sub-lenses are orthogonal to each other. The identical pretilt angle gradient and the same thickness of the sub-lenses result into mutual birefringence compensation. In that case the phase gradient of the polarization-independent LC lens system is not observed in the polarization microscope what the lens is at 45 degree to the polarizer crossed with analyzer.

Figure 8:
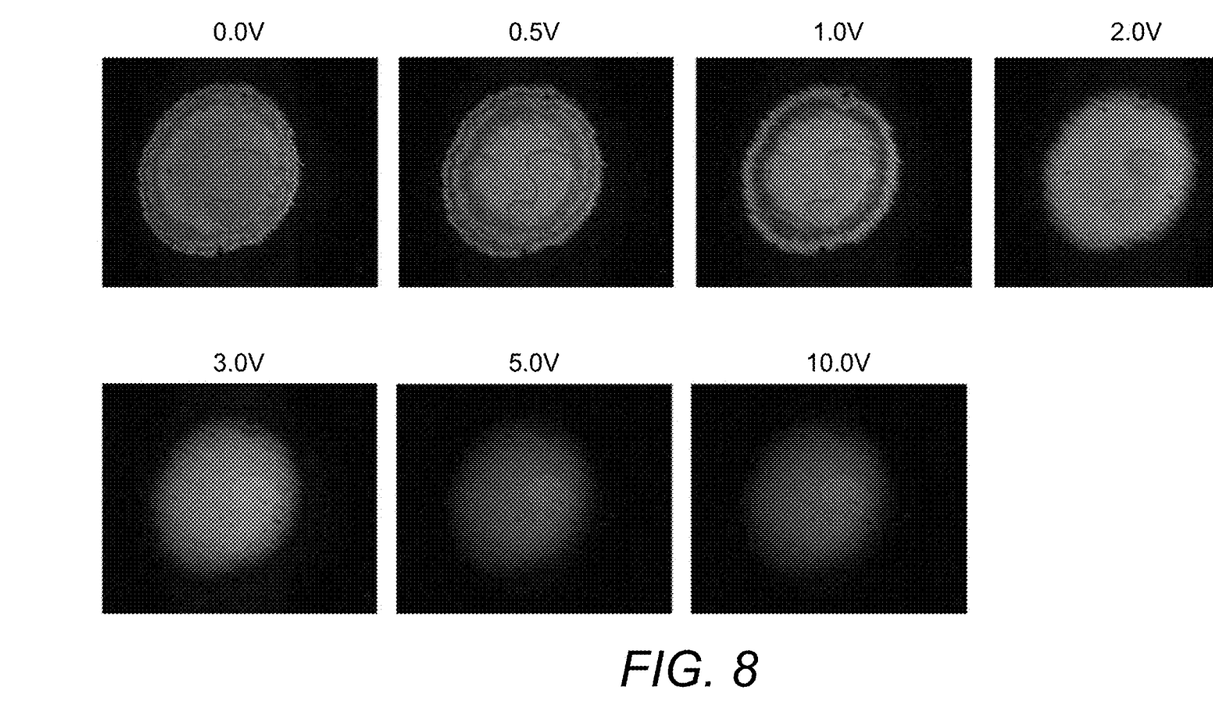
FIG. 8 Microscopic picture of self-aligned polarization-independent LC lens sample. The top sub-lens (F-type) is off by 15V and the bottom sub-lens (M-type) voltage changes from 0 to 10V.

In order to observe and analyze the optical phase distribution, independent control of the LC lens sample was performed. First, high voltage level of 15 V was applied to top sub-lens to turn the lens off by switching the liquid crystal into uniform vertical orientation. Then different voltage levels of 0 to 10 V were applied (FIG. 8). As can be seen in FIG. 8, 10 V is sufficient to switch the liquid crystal of the sub-lens into vertical state and almost completely turn off the distribution of optical phase gradient into uniform phase plate, which corresponds to the lens with infinite focal length. We conclude that the operation voltage levels of the obtained LC lens for tunable focal length are below 10 V AC 1 kHz. The phase distribution of the liquid crystal lens under operation at different applied voltage levels is shown in FIG. 8.

Figure 9:
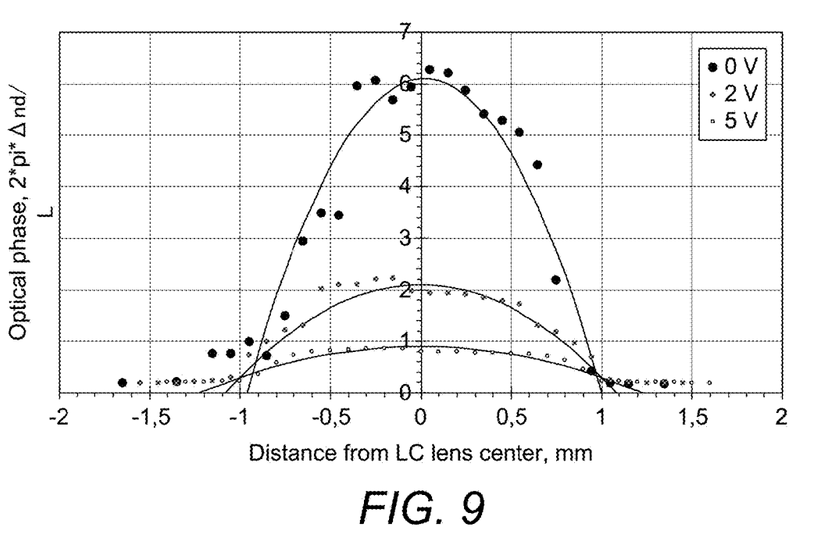
FIG. 9 Direct measurement of LC sub-lens optical phase distribution for applied voltage levels of 0V, 2V and 5V.
Figure 10:
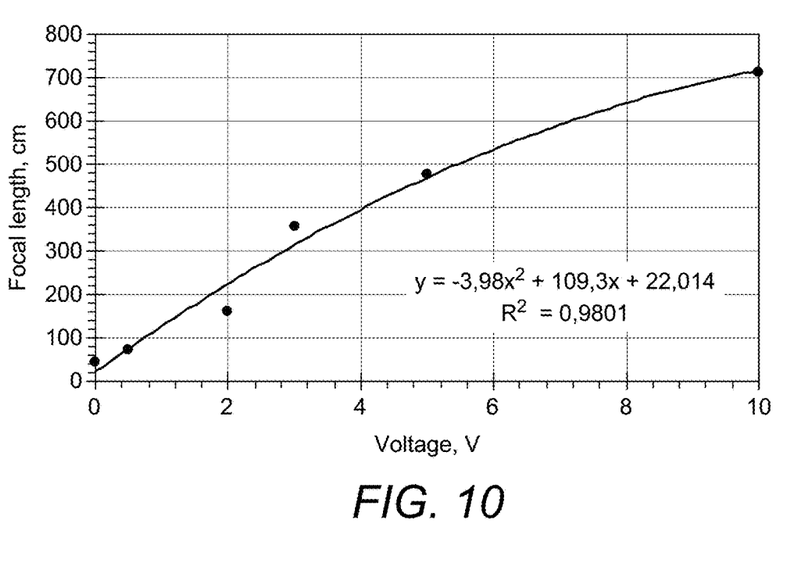
FIG. 10 Dependence of focal length on the applied voltage to electrodes of self-aligned polarization-independent LC lens.

The dependences of optical phase on the distance from LC lens center were plotted for different voltage levels (FIG. 9). The obtained dependence of the focal length on the applied voltage for the LC lens sample is plotted in FIG. 10.

Although the present embodiments have been described with reference to specific example embodiments, it will be evident that various modifications and changes may be made to these embodiments without departing from the broader spirit and scope of the various embodiments.

INDUSTRIAL APPLICABILITY

The fabrication process of this disclosure allows for a simultaneous fabrication of two orthogonally oriented sub-lenses in a self-aligned manner, thereby avoiding use of alignment mechanical equipment. The LC lens or LC lens system of this disclosure can be used in various types of camera and web-camera including cell phone and tablet cameras. The LC lens or LC lens system of this disclosure can also be used in light field cameras for 3D image capture or 3D microscopy, and in autostereoscopic and holographic 3D displays for glasses free 3D image display. Accordingly, the specification and drawings are to be regarded in an illustrative rather than a restrictive sense.

What is claimed is:

1. A liquid crystal (LC) lens, comprising:
   a first planar substrate having on a surface thereof a layer of first alignment material comprising a co-polymer of a first photosensitive monomer and at least one alkyl methacrylate monomer; and
   a second planar substrate having on a surface thereof a layer of second alignment material comprising a co-polymer of a second photosensitive monomer and at least one alkyl methacrylate monomer, wherein the first and second substrates are assembled in parallel configuration such that the layers of alignment material face each other and are spaced apart, and wherein the first and second photosensitive monomers are of different photosensitivities, and wherein particles of the first alignment material have a pretilt angle gradient that is different from a pretilt angle gradient of the second alignment material.

2. The liquid crystal lens of claim 1, further comprising a spacer between the layers of alignment material.

3. The liquid crystal lens of claim 1, wherein the substrates are attached together at contours thereof, optionally the attachment is made with UV glue.

4. The liquid crystal lens of claim 1, wherein the substrates are glass substrates.

5. The liquid crystal lens of claim 1, further comprising an electrode mounted on a surface of at least one of the substrates.

6. The liquid crystal lens of claim 1, having a focal length which may be controllably changed at a voltage between about 1-10V AC.

7. A liquid crystal (LC) lens system, comprising:
   first planar substrates each having on both surfaces thereof a layer of first alignment material comprising a co-polymer of a first photosensitive monomer and at least one alkyl methacrylate monomer; and
   second planar substrates each having on both surfaces thereof a layer of second alignment material comprising a co-polymer of a second photosensitive monomer and at least one alkyl methacrylate monomer, wherein the substrates are assembled in parallel configuration such that a layer of first alignment material and a layer of second alignment material face each other and are spaced apart, and wherein the first and second photosensitive monomers are of different photosensitivities, and wherein particles of the first alignment material have a pretilt angle gradient that is different from a pretilt angle gradient of the second alignment material.

8. The liquid crystal lens system of claim 7, wherein the pretilt angle gradient in the first alignment material on the first substrates is identical, and the pretilt angle gradient in the second alignment material on the second substrates is identical.

9. A method for making an electrically tunable liquid crystal (LC) lens, comprising:
   (a) providing a first planar substrate and a second planar substrate;
   (b) depositing on a surface of the first substrate a layer of a first alignment material comprising a co-polymer of a first photosensitive monomer and at least one alkyl methacrylate monomer;
   (c) depositing on a surface of the second substrate a layer of a second alignment material comprising a co-polymer of a second photosensitive monomer and at least one alkyl methacrylate monomer;
(d) submitting each of the first substrate obtained at step (b) and the second substrate obtained at step (c) to a soft-baking process;
(e) submitting each of the first and second substrates obtained at step (d) to a rubbing process;
(f) submitting each of the first and second substrates obtained at step (e) to UV exposure;
(g) assembling the first and second substrates obtained at step (f) in parallel configuration such that the layers of alignment material face each other and are spaced apart, wherein the first and second photosensitive monomers are of different photosensitivities, and wherein particles of the first alignment material have a pretilt angle gradient that is different from a pretilt angle gradient of the second alignment material.

10. The method of claim 9, wherein at steps (b) and (c) the materials are in a solvent, and the soft-baking process at step (d) removes the solvent.

11. The method of claim 9, wherein at step (e) rubbing directions on the two sides of the substrate are orthogonal, and the rubbing process induces an azimuthal alignment of particles in the materials.

12. The method of claim 9, wherein at step (f) a gradient UV exposure is performed simultaneously on two sides of the substrate, and the UV exposure induces a pretilt angle in particles of the alignment materials.

13. A method for making an electrically tunable liquid crystal lens (LC) system, comprising:
(a) providing first planar substrates and second planar substrates;
(b) depositing on both surfaces of each of the first substrates a layer of a first alignment material comprising a co-polymer of a first photosensitive monomer and at least one alkyl methacrylate monomer;
(c) depositing on both surfaces of each of the two second substrates a layer of a second alignment material comprising a co-polymer of a second photosensitive monomer and at least one alkyl methacrylate monomer;
(d) submitting each of the first substrates obtained at step (b) and each of the second substrates obtained at step (c) to a soft-baking process;
(e) submitting each of the first and second substrates obtained at step (d) to a rubbing process;
(f) submitting each of the first and second substrates obtained at step (e) to UV exposure; and
(g) assembling the first substrate and second substrates obtained at step (f) in parallel configuration such that a layer of first alignment material and a layer of second alignment material face each other and are spaced apart, wherein the first and second photosensitive monomers are of different photosensitivities, and wherein particles of the first alignment material have a pretilt angle gradient that is different from a pretilt angle gradient of the second alignment material.

14. The liquid crystal (LC) lens claim 1, wherein the photosensitive monomer is of general formula I or II, and the at least one alkyl methacrylate monomer is of general formula III wherein: R is a $C_1$ to $C_{12}$ linear, branched, saturated and/or unsaturated alkyl group; Ri, Rj and Rk each independently represent a $C_1$ to $C_{12}$ linear, branched, saturated alkyl group, unsaturated alkyl groups; n is an integer from 0-3; m and l are each independently an integer from 0-4; and p is an integer from 0-30.

15. The liquid crystal (LC) lens claim 1, wherein the photosensitive monomer is of general formula IA or IIA, and the at least one alkyl methacrylate monomer is of general formula III

-continued

IIA

III wherein: R is a $C_1$ to $C_6$ alkyl group; Rk is a $C_1$ to $C_6$ alkyl group; m is an integer from 0-2; and p is an integer from 1-20.

16. The liquid crystal (LC) lens claim 1, wherein the photosensitive monomer is of formula M or F, and the at least one alkyl methacrylate monomer is selected from formulae VA, PL and PL1

M

F

VA

PL

PL1

17. The liquid crystal (LC) lens claim 16, wherein the co-polymer is of M, VA, PL and PL1 or the co-polymer is of F, VA, PL and PL1.

18. The liquid crystal (LC) lens claim 17, wherein the co-polymer is of M, VA, PL and PL1; and wherein M is present in an amount of about 7-17% mol; VA is present in an amount of about 2.5-12.5% mol; PL is present in an amount of is present in an amount of about 65.5-75.5% mol; and PL1 is present in an amount of about 5-15%.

19. The liquid crystal (LC) lens claim 17, wherein the co-polymer is of F, VA, PL and PL1; and wherein F is present in an amount of about 0.5-9% mol; VA is present in an amount of about 3-15.5% mol; PL is present in an amount of about 73-82.5% mol; and PL1 is present in an amount of about 5.5-15% mol.

* * * * *